(12) United States Patent
Michael et al.

(10) Patent No.: US 6,264,418 B1
(45) Date of Patent: *Jul. 24, 2001

(54) WORKPIECE POSITIONER

(75) Inventors: Zane Allan Michael, Troy; Daniel Warren Slanker, Huber Heights; Wade Matthew Hickle, West Carrollton; William Harold DeCamp, Cincinnati, all of OH (US)

(73) Assignee: Motoman, Inc., West Carrolton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/050,606

(22) Filed: Mar. 30, 1998

(51) Int. Cl.$^7$ ....................................................... B66C 1/00
(52) U.S. Cl. ................... 414/733; 198/468.6; 198/475.1; 198/750.14; 198/797
(58) Field of Search .................................... 414/680, 733; 198/468.6, 475.1, 750.14, 797

(56) References Cited

U.S. PATENT DOCUMENTS

| | | |
|---|---|---|
| 1,740,575 | 12/1929 | Clausen et al. . |
| 1,786,608 | 12/1930 | Halstead . |
| 4,392,766 | 7/1983 | Blunt . |
| 4,658,501 | 4/1987 | Fujii et al. . |
| 4,666,363 | 5/1987 | Johansson . |
| 4,760,237 | 7/1988 | Mizukado et al. . |
| 4,884,189 | 11/1989 | Kimura et al. . |
| 4,953,262 | 9/1990 | Zinser . |
| 5,074,741 | 12/1991 | Johansson . |
| 5,326,218 | * 7/1994 | Fallas ..................................... 414/733 |
| 5,373,136 | 12/1994 | Ernst et al. . |
| 5,415,057 | 5/1995 | Nihei et al. . |
| 5,423,648 | 6/1995 | Akeel et al. . |
| 5,658,476 | 8/1997 | Gullo et al. . |
| 5,873,569 | 2/1999 | Boyd et al. . |

FOREIGN PATENT DOCUMENTS

| | | |
|---|---|---|
| 0 442 160 A2 | 8/1991 | (EP) . |
| 48422 | 1/1983 | (TW) . |

OTHER PUBLICATIONS

Article by United States Robots, Providing the competitive edge in component coating.

* cited by examiner

Primary Examiner—Donald W. Underwood
(74) Attorney, Agent, or Firm—Killworth, Gottman, Hagan & Schaeff LLP

(57) ABSTRACT

A workpiece positioner is provided which is adapted to move a workpiece from a load/unload zone to a work zone spaced from the load/unload zone. The workpiece positioner comprises a first stationary frame, a second frame coupled to the first frame so as to be rotatable relative to the first frame about a first axis, a first drive device for effecting rotation of the second frame about the first axis, and a first workpiece holder adapted to releasably receive a workpiece. In accordance with a first embodiment of the present invention, the first holder is rotatably mounted to the second frame so that the workpiece holder and the workpiece are maintained in a substantially constant orientation relative to the first frame as the second frame is rotated about the first axis. In accordance with a second embodiment of the present invention, the workpiece positioner further includes a second drive device coupled to the second frame so as to move with the second frame. The second drive device is adapted to effect rotation of the workpiece holder about a second axis spaced from the first axis.

8 Claims, 12 Drawing Sheets

WORKPIECE POSITIONER

FIELD OF THE INVENTION

The present invention relates to a workpiece positioner which is adapted to move a workpiece from a load/unload zone to a work zone spaced from the load/unload zone. More particularly, it relates to a workpiece positioner which is capable of maintaining a workpiece in a substantially constant orientation as it moves the workpiece from the load/unload zone to the work zone and vice versa. In another embodiment, the workpiece positioner is capable of rotating the workpiece about an axis extending through the workpiece as it indexes the workpiece from the load/unload zone to the work zone and vice versa.

BACKGROUND OF THE INVENTION

Workpiece positioners are known which are capable of moving a workpiece from a load/unload zone to a work zone where, for example, an arc welding operation is performed on the workpiece. One known workpiece positioner includes a movable beam or frame which is capable of rotating back and forth through an angle of about 180°. First and second workpiece holders are positioned on the movable frame. As the frame rotates from the load/unload zone to the work zone, the workpiece is inverted, i.e., rotated 180°. With some workpieces, it is necessary that the workpiece be returned to its initial orientation before work begins on the workpiece. In order to effect rotation of the workpiece back to its initial orientation, an indexing device is provided.

The indexing device is mounted to a fixed frame. Once the workpiece holder and its workpiece have been moved to the work zone, a portion of the indexing device extends to the workpiece holder and effects rotation of the holder through 180°. Hence, after rotation, the workpiece is in substantially the same orientation in the work zone as it was when loaded onto the workpiece holder in the load/unload zone. However, due to this indexing step, there is a time delay after the workpiece has been moved to the work zone before work may begin on the workpiece. This time delay or added cycle time is undesirable.

SUMMARY OF THE INVENTION

In accordance with a first embodiment of the present invention, a workpiece positioner is provided which uses gravity to maintain a workpiece in a substantially constant orientation as the workpiece is moved from a load/unload zone to a work zone. In accordance with a further embodiment of the present invention, a workpiece positioner is provided which is capable of effecting rotation of a workpiece about an axis passing through the workpiece simultaneously with the movement of the workpiece from a load/unload zone to a work zone. In both embodiments, the workpiece is in substantially the same orientation in the work zone as it was when loaded onto the workpiece holder in the load/unload zone. Thus, cycle time is reduced in both embodiments as it is not necessary to index the workpiece to its initial orientation once it has moved into the work zone. Further with regard to the first embodiment, the overall cost of the device is substantially reduced as a driven indexing device is not required.

In accordance with a first aspect of the present invention, a workpiece positioner is provided which is adapted to move a workpiece from a load/unload zone to a work zone spaced from the load/unload zone. The workpiece positioner comprises a first stationary frame, a second frame coupled to the first frame so as to be rotatable relative to the first frame about a first axis, a first drive device for effecting rotation of the second frame about the first axis, and a first workpiece holder adapted to releasably receive a workpiece. The first holder is rotatably mounted to the second frame so that the workpiece holder and the workpiece are maintained in a substantially constant orientation relative to the first frame as the second frame is rotated about the first axis.

The workpiece holder and the workpiece are rotated by way of gravity as the second frame is rotated about the first axis.

The workpiece positioner preferably further comprises a locking device fixedly mounted to the second frame. The locking device is adapted to engage the first workpiece holder to maintain the first workpiece holder in a substantially fixed position relative to the second frame when the workpiece holder is located in one of the load/unload zone and the work zone. The locking device comprises a piston/cylinder unit having a piston which is movable between extended and retracted positions. The piston engages the workpiece holder when positioned in its extended position so as to lock the workpiece holder in a substantially fixed position relative to the second frame. The piston does not engage the workpiece holder when positioned in its retracted position such that the workpiece holder is capable of rotating relative to the second frame.

Preferably, the workpiece positioner further comprises first and second shielding panels which are fixedly connected to the second frame.

The second frame may comprise a first section rotatable about the first axis, and second and third sections fixedly mounted to the first section. The third section is spaced from the second section and the second and third sections are substantially transverse to the first section.

The first workpiece holder preferably comprises a first headstock rotatably mounted to the second section and a first tailstock rotatably mounted to the third section.

The workpiece positioner preferably comprises a second workpiece holder adapted to releasably receive a workpiece and to rotate about a third axis which is spaced from the first and second axes. The second workpiece holder comprises a second headstock rotatably mounted to the second section and a second tailstock rotatably mounted to the third section.

A sensor may also be provided for detecting if the first headstock is properly positioned relative to the second section after the second frame has been rotated about the first axis.

In accordance with a second aspect of the present invention, a workpiece positioner is provided which is adapted to move a workpiece from a load/unload zone to a work zone spaced from the load/unload zone. The workpiece positioner comprises a first stationary frame, a second frame coupled to the first frame so as to be movable relative to the first frame, a first drive device for effecting movement of the second frame relative to the first frame, and a first workpiece holder adapted to releasably receive a workpiece. The workpiece holder is movably mounted to the second frame so that the workpiece holder and the workpiece are maintained in a substantially constant orientation relative to the first frame as the second frame is moved relative to the first frame.

In accordance with a third aspect of the present invention, a workpiece positioner is provided which is adapted to move a workpiece from a load/unload zone to a work zone spaced from the load/unload zone. The workpiece positioner comprises a first frame which is stationary, a second frame rotatably coupled to the first frame so as to rotate about a first axis, a first drive device for effecting rotation of the second frame about the first axis, a first workpiece holder adapted to releasably receive a workpiece and rotate about a second axis which is spaced from the first axis, and a piston/cylinder second drive device coupled to the second frame so as to move with the second frame. The piston/cylinder drive device is adapted to effect the rotation of the workpiece holder about the second axis.

The piston/cylinder drive device may comprise a piston/cylinder unit having a rack and a pinion. The pinion is fixedly connected to the first workpiece holder. The piston/cylinder drive device is capable of effecting rotation of the workpiece holder about the second axis while the first drive device effects rotation of the second frame about the first axis.

In accordance with a fourth aspect of the present invention, a workpiece positioner is provided comprising a first stationary frame having first and second structural elements, a second frame coupled to the first frame so as to be movable relative to the first frame, a drive device for effecting movement of the second frame relative to the first frame, and a first workpiece holder adapted to releasably receive a workpiece. The first workpiece holder is mounted to the second frame. The drive device includes a motor operatively connected to the second frame for effecting back and forth movement of the second frame between first and second end positions. The second frame engages the first structural element when located in its first end position and the second structural element when located in its second end position. The drive device further includes a control unit for controlling the operation of the motor. The control unit includes a torque sensor for sensing the torque of the motor. The control unit deactivates the motor once the torque of the motor reaches a predefined level after the second frame engages one of the first and second structural elements.

The drive device further comprises a brake which is capable of releasably locking the motor in position. The control unit engages the brake once it senses that the motor torque has reached the predefined level. The control unit preferably engages the brake before deactivating the motor. The control unit may comprise a controller and an inverter.

The motor is operable at a normal speed and a slow speed. The control unit operates the motor at its slow speed once the second frame reaches a predetermined distance from one of the first and second structural elements.

Each of the first and second structural elements may comprise a stop block.

The drive device further includes at least one sensor for sensing when the second frame is located at a predetermined distance from one of the first and second structural elements. The one sensor may comprise a proximity sensor.

DETAILED DESCRIPTION OF THE PREFERRED EMBODIMENT

Figure 1:
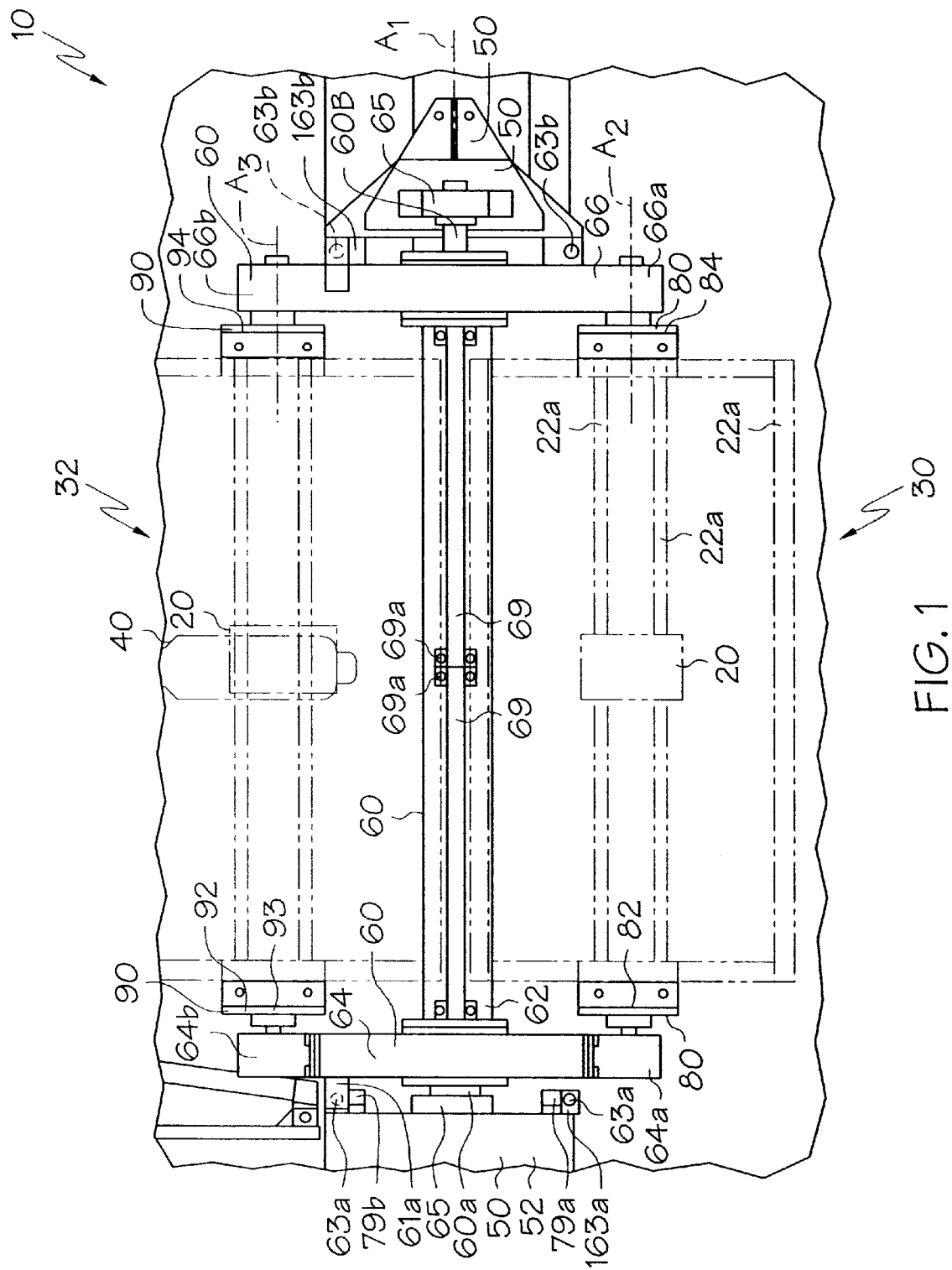
FIG. 1 is a top view of a workpiece positioner constructed in accordance with a first embodiment of the present invention.
Figure 2:
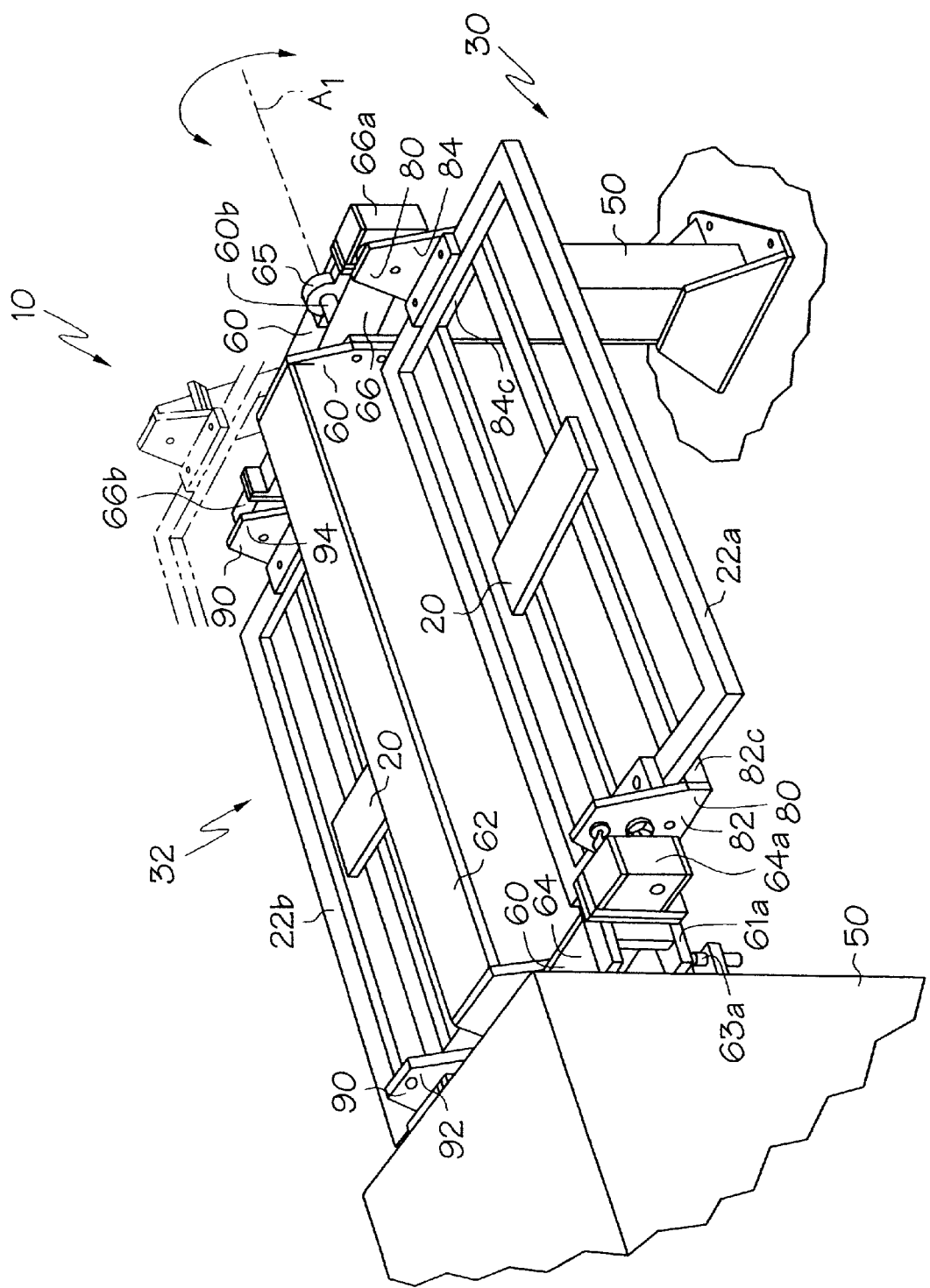
FIG. 2 is a perspective view of the workpiece positioner illustrated in FIG. 1 with its shielding panels removed.
Figure 9:
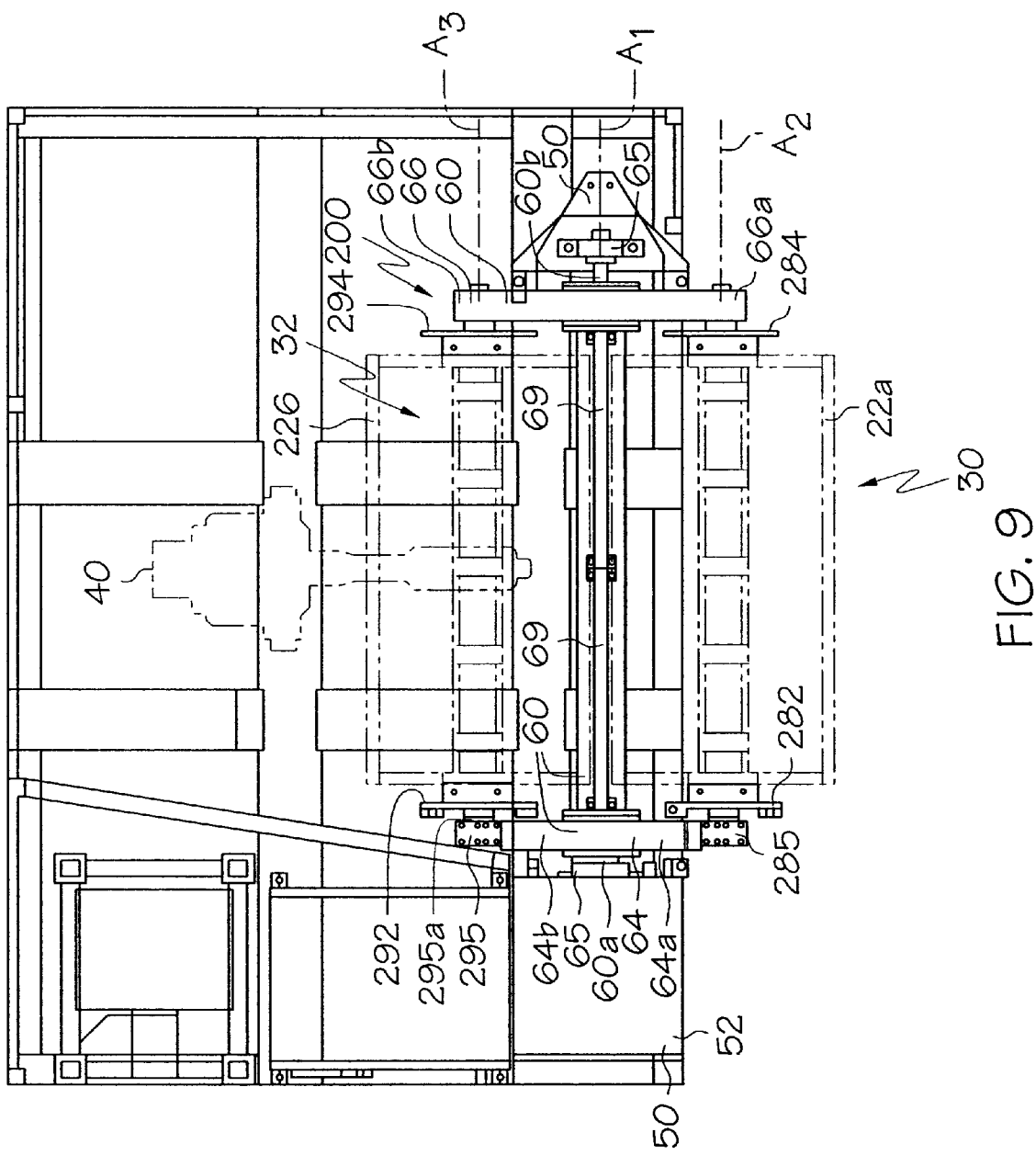
FIG. 9 is a top view of a workpiece positioner constructed in accordance with a second embodiment of the present invention.
Figure 10:
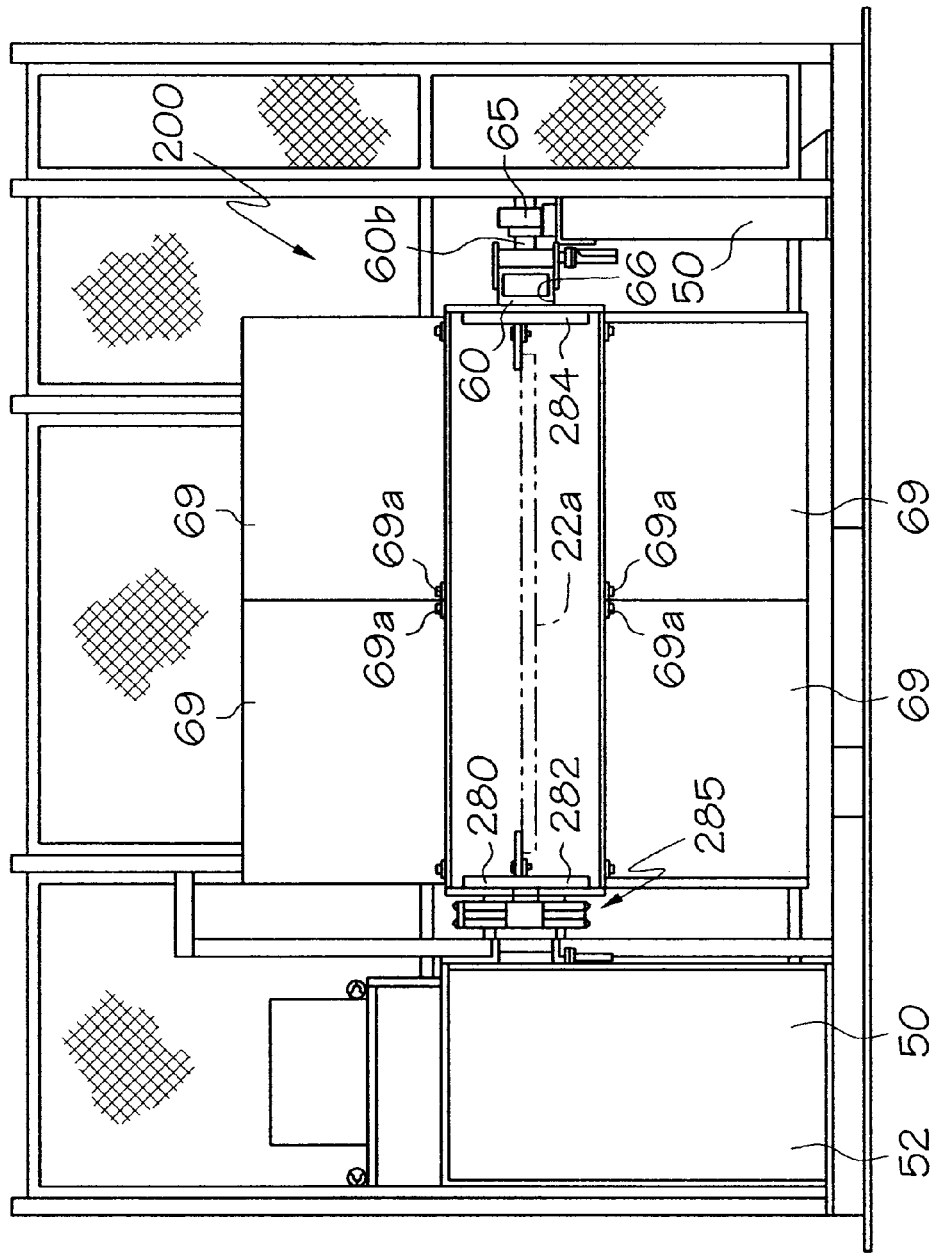
FIG. 10 is a front view of the workpiece positioner shown in FIG. 9.

Reference is now made to FIGS. 1 and 2, which illustrate a workpiece positioner 10 constructed in accordance with a first embodiment of the present invention. The workpiece positioner 10 is capable of moving workpieces 20 from a load/unload zone 30 to a work zone 32 spaced from the load/unload zone 30. A conventional device 40, shown in phantom in FIGS. 1 and 9, is provided in the work zone 32 for cutting or welding the workpieces 20 indexed into the work zone 32. The device 40 comprises, in the illustrated embodiment, an articulated arm robot (see, e.g., U.S. Pat. No. 4,884,189, the disclosure of which is hereby incorporated by reference) having a Nd:YAG continuous wave (CW) cutting or welding head. Such a robot is commercially available from Motoman Inc. and is sold under any one of the following trademarks: Motoman® SK6, SK16, SK16A, SK45 or SK120 Robot. The device 40 may alternatively comprise any computer-controlled machine used in cutting or welding, such as an electric-arc welding device.

In the illustrated embodiment, first and second fixtures 22a and 22b are provided for supporting the workpieces 20 on the positioner 10. The workpieces 20 may be clamped, bolted or otherwise secured to the fixtures 22a and 22b. Examples of workpieces 20 which may be mounted to the fixtures 22a and 22b include automotive sub-assemblies, brackets, auto seating assemblies, and farm machinery components such as brake pedal assemblies and steering wheel assemblies. During welding or cutting operations, an operator, positioned in the load/unload zone 30, removes finished workpieces 20 from the fixture located in the zone 30 and subsequently secures additional workpieces 20 to the fixture which are to be cut or welded once they have been indexed into the work zone 32.

The workpiece positioner 10 comprises a first stationary frame 50 and a second frame 60 coupled to the first frame 50 so as to be rotatable relative to the first frame 50 about a first axis $A_1$ see FIG. 2. The second frame 60 comprises a first section 62 rotatable about the first axis $A_1$ and second and third sections 64 and 66 fixedly mounted to the first section 62. In the illustrated embodiment, the first section 62 comprises an I-beam while the second and third sections 64 and 66 comprise beams which are substantially rectangular in cross section. The third section 66 is spaced from the second section 64 and the second and third sections 64 and 66 are substantially transverse to the first section 62. First and second shafts 60a and 60b extend out from opposite ends of the first section 62 and are received in bearings 65 mounted to the first stationary frame 50. Thus, the second frame 60 rotates relative to the first frame 50 about the first axis $A_1$ via the bearing supported shafts 60a and 60b.

Upper and lower shielding panels 69 are fixedly connected to the first section 62 of the second frame 60. The shielding panels 69 function to shield an operator positioned in the load/unload zone 30 from welding flash. Only the upper panels 69 are illustrated in FIG. 1 and none of the shielding panels 69 are shown in FIGS. 2 and 3.

A drive device 70 is provided for effecting rotation of the second frame 60 about the first axis $A_1$. The drive device 70 comprises a convention drive unit 72 including an AC synchronous motor 72a, a gearbox 72b (preferably a spiral bevel gear reducer) and a brake 72c, see FIG. 3. The drive unit 72 is housed within a cabinet 52. The cabinet 52 forms part of the first frame 50, see also FIG. 1. A conventional inverter 310 is used to control the acceleration, deceleration and speed of the motor 72a and the operation of the brake 72c. The inverter 310 communicates with and is controlled by a conventional controller 320, which also controls the device 40. The drive unit 72 is commercially available from SEW Eurodrive. The inverter 310 is commercially available from EMS of Cincinnati, Ohio under the product designation "G5 Series Variable Frequency Drive, with Crane Option." The device controller 320 is commercially available from Motoman Inc. The inverter 310 and the controller 320 are also referred to herein as a control unit.

The drive unit 72 further includes a first drive gearbelt pulley 72d connected to the motor 72a. A second drive gearbelt pulley 74 is fixedly connected via bolts 75 to the shaft 60a, which extends through the cabinet 52. A gearbelt 76 extends about the first and second drive pulleys 72d and 74 to effect rotation of the second frame 60 upon actuation of the motor 72a.

Figure 3:
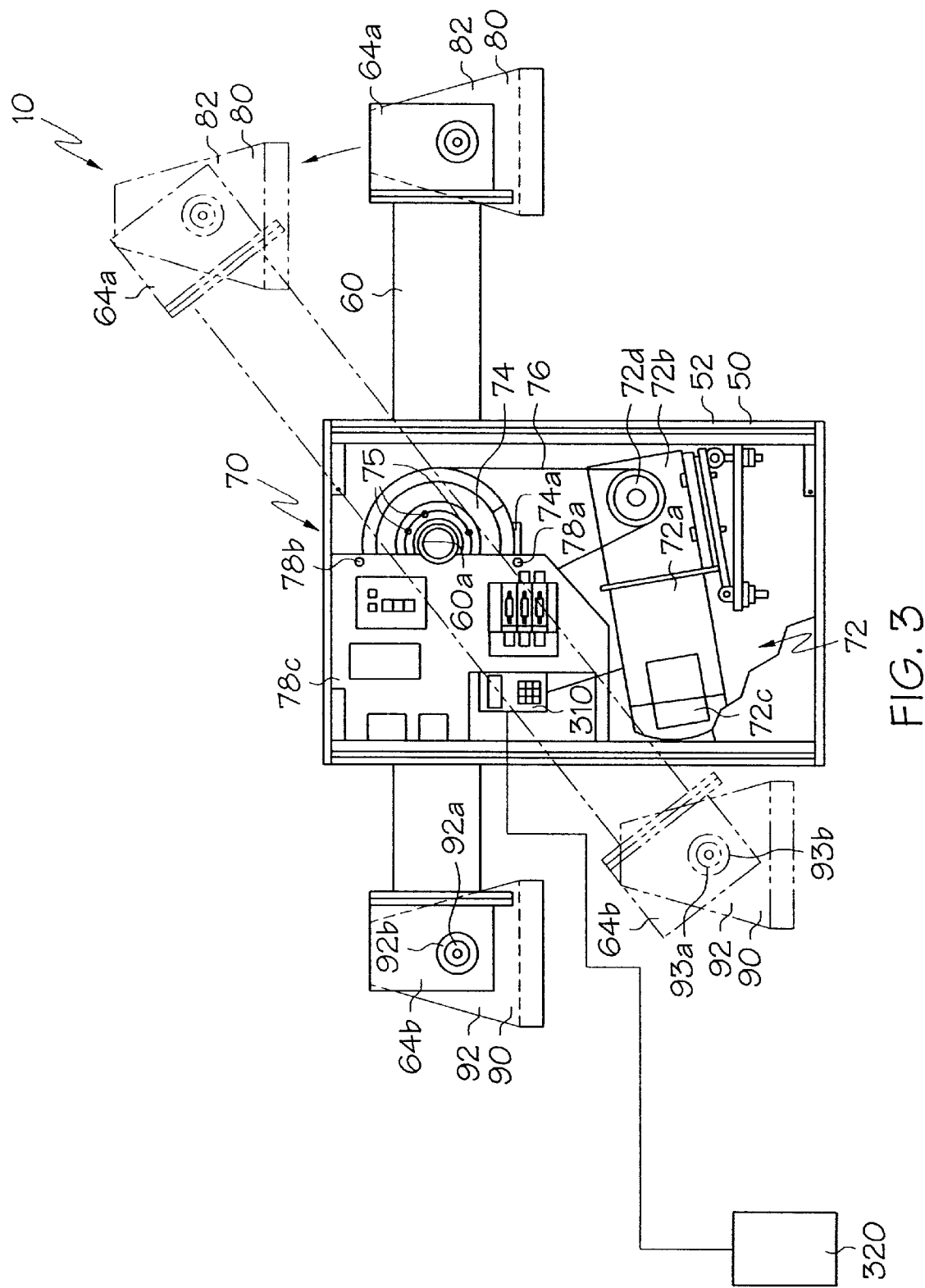
FIG. 3 is a side view of the workpiece positioner illustrated in FIG. 1 with its shielding panels removed.

A position sensor plate 74a is secured to the second pulley 74, see FIG. 3. A pair of conventional proximity sensors or switches 78a and 78b are attached to a control panel 78c provided in the cabinet 52 adjacent to the second pulley 74. The motor 72a is caused to operate at high and low speeds via the inverter 310 so as to effect rotation of the second frame 60 back and forth through an angle of, for example, about 180°. The sensor plate 74a is appropriately positioned on the second pulley 74 such that one of the switches 78a and 78b senses the plate 74a for a predetermined time period just before a rotation cycle ends. The one switch 78a or 78b generates a low speed signal to the controller 320 upon sensing an initial position of the plate 74a at the end of a rotation cycle. In response, the controller 320 causes the inverter 310 to operate the motor 72a at a reduced or low speed.

The other proximity switch 78b or 78a senses the plate 74a for a predetermined time period at the beginning of the rotation cycle. However, the controller 320 ignores signals generated by the other switch 78b or 78a at the beginning of the rotation cycle.

When the second frame 60 reverses its direction, the one switch 78a or 78b senses the plate 74a for a predetermined time period at the beginning of the rotation cycle. The controller 320, however, ignores signals generated by the one switch at the beginning of the rotation cycle. The other switch 78b or 78a senses the plate 74a for a predetermined time period just before the rotation cycle ends. Upon sensing the plate 74a, the other switch 78b or 78a generates a low speed signal to the controller 320. In response, the controller 320 causes the inverter 310 to operate the motor 72a at a reduced speed.

At the start of each rotation cycle, the inverter 310 accelerates the motor 72a to its high speed within a predetermined time period, e.g., 0.5 second, without maintaining the motor 72a at a slower speed for any significant amount of time. Hence, the second frame 60 is initially rotated at a high speed and, just before the rotation cycle has been completed, its speed is reduced.

It is also contemplated that a single sensor, e.g., a single limit switch (not shown), provided in the cabinet 52, and two sensor plates (not shown) connected to the second pulley 74 may be used in place of the proximity switches 78a and 78b and the single sensor plate 74a. The limit switch generates a low speed signal to the controller 320 upon sensing an initial portion of one of the two sensor plates at the end of a rotation cycle. It is further contemplated that the inverter 310 may be programmed to reduce the speed of the motor 72a a predefined time period after a rotation cycle has been initiated by the controller 320. Hence, in this embodiment, the inverter 310 further serves as a timer. Additionally, no sensors for sensing the position of a sensor plate coupled to the second pulley 74 are required.

First and second sets of shock absorbers 63a and 63b are mounted via mounts 163a and 163b at opposite sides of the first frame 50, see FIGS. 1, 6, 7 and 12. The shock absorbers 63a and 63b may comprise ones which are commercially available from Ace Controls Inc. under the product designation "ACE SC 650 HD-4." A first extending portion 61a of the second frame 60 engages one of the two shock absorbers 63a and one of two stop blocks 164a, only shown in FIGS. 6, 7 and 12, which are also mounted on the mounts 163a at the end of each rotation cycle. Likewise, a second extending portion 61b of the second frame 60 engages one of the two shock absorbers 63b and one of two stop blocks (not shown) also mounted on the mounts 163b at the end of each rotation cycle.

Figure 6:
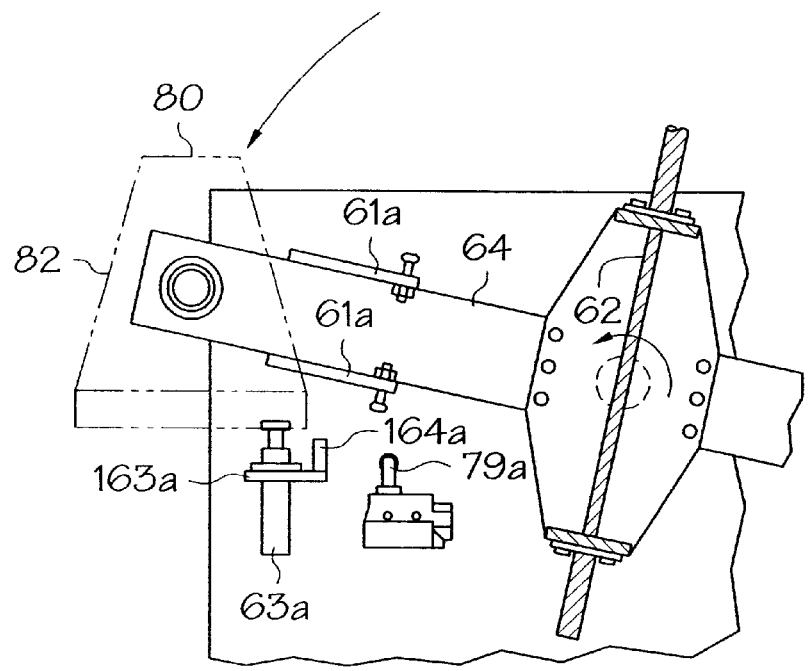
FIGS. 6 and 7 are views of the second section of the second frame before and after it engages one of the in-position limit switches.
Figure 7:
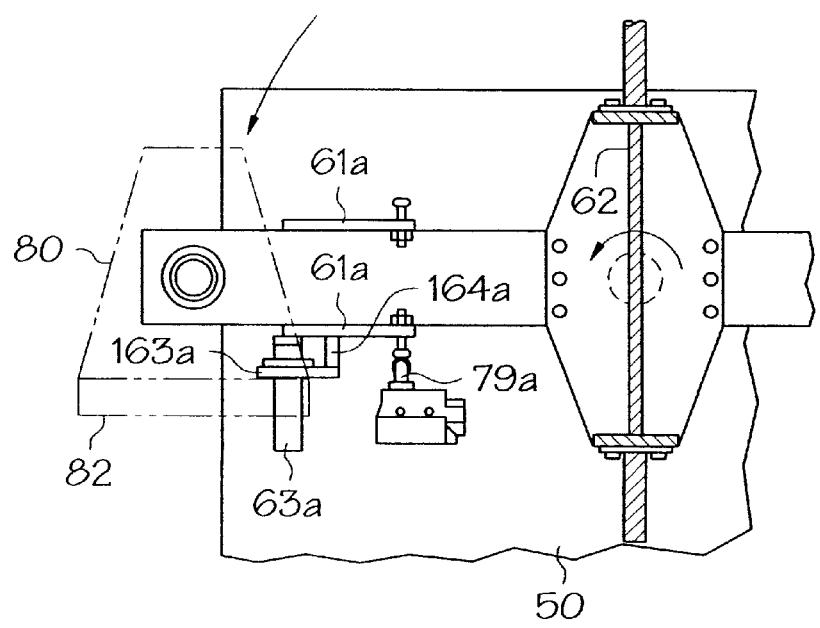

First and second in-position push-button limit switches 79a and 79b are mounted to the first frame 50, see FIGS. 1, 6 and 7. The first extending portion 61a of the second frame 60 engages either switch 79a or switch 79b as it comes to rest against one of the first shock absorbers 63a and one of the two stop blocks 164a at the end of a rotation cycle. In FIG. 1, switch 79b is shown engaged by the extending portion 61a. In FIG. 7, switch 79a is shown engaged by the extending portion 61a. The actuated switch generates an appropriate signal to the device controller 320 indicating that the second frame 60 has completed its 180° of rotation and is in its final position, e.g., a final welding position. After receiving the signal from the actuated switch, the controller 320 initiates operation of the device 40. If the second frame 60 moves out of its final position, the actuated switch will no longer be engaged and, hence, will provide a second frame out-of-position signal to the controller 320. In response, the controller 320 will shut down operation of the device 40.

The inverter 310 includes a torque sensor (not shown) which determines motor torque based upon current demand of the motor 72a. As noted above, once one of the proximity switches 78a or 78b senses the sensor plate 74a at the end of a rotation cycle, the controller 320 causes the inverter 310 to operate the motor 72a at a reduced or low speed. The motor 72a continues to operate at this speed as the extending portions 61a and 61b engage two of the four shock absorbers 63a and 63b. The inverter 310 maintains the motor torque at a level sufficient to collapse pistons of the two shock absorbers 63a and 63b. When the extending portions 61a and 61b engage two of the four stop blocks, the motor torque increases. Once the motor torque reaches a predetermined level, indicating that the extending portions 61a and 61b have engaged two of the four stop blocks, the inverter 310 engages the brake 72c and, thereafter, deactivates the motor 72a. Thus, once the inverter 310 senses that the motor torque has reached the predetermined level, it deactivates the motor 72a.

Figure 4:
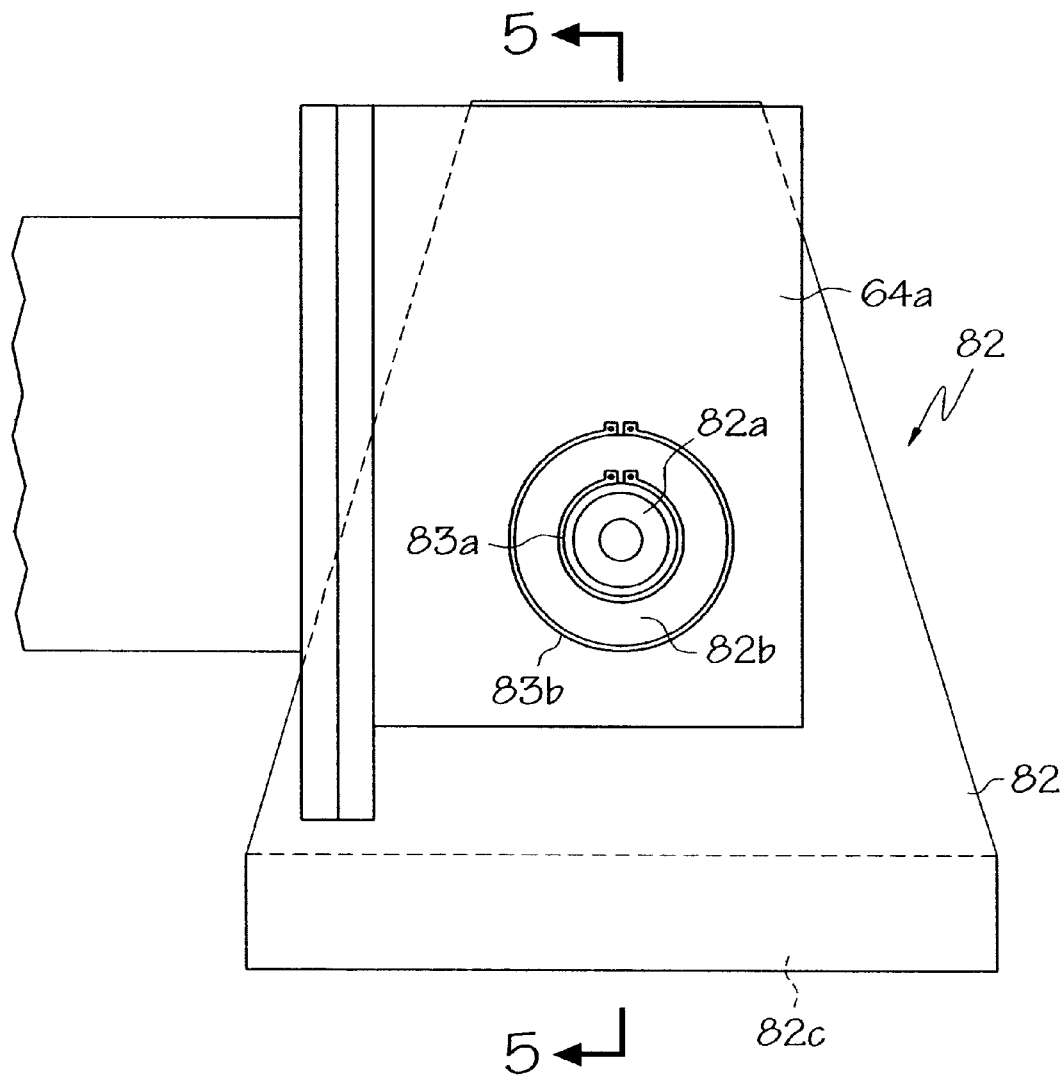
FIG. 4 is a side view of a first headstock of a first workpiece holder of the positioner illustrated in FIG. 1.

The workpiece positioner 10 further includes first and second workpiece holders 80 and 90 for supporting the workpiece fixtures 22a and 22b. The first workpiece holder 80 comprises a first headstock 82 having a hollow shaft 82a rotatably mounted in two bearings 82b and a faceplate 83, see FIGS. 4 and 5. The bearings 82b are supported in a first end 64a of the second section 64. First and second snap rings 83a and 83b are respectively secured to the hollow shaft 82a and one of the bearings 82b to maintain the shaft 82a and the bearing 82b lockingly secured in place within the first end 64a. A workpiece fixture mounting block 82c is bolted or otherwise secured to the headstock 82, see FIG. 5. The fixture 22a is bolted to the block 82c, as shown in phantom in FIG. 5. Because the shaft 82a is hollow, fluid or electrical lines are capable of passing through it.

The first workpiece holder 80 further comprises a first tailstock 84 which is rotatably mounted via bearings to a first end 66a of the third section 66. The tailstock 84 also includes a workpiece fixture mounting block 84c, see FIG. 2. An opposite end of the workpiece fixture 22a is bolted or otherwise secured to the block 84c.

Preferably, the workpiece fixture 22a is mounted to the mounting blocks 82c and 84c so that the center of gravity of the workpiece fixture 22a and its attached workpieces 20 is located below a second axis $A_2$ passing through the bearings supporting the headstock 82 and the tailstock 84, see FIGS. 1 and 5. Because the headstock 82 and the tailstock 84 are free to rotate relative to the second and third sections 64 and 66, the workpiece fixture 22a and the workpieces 20 secured to the fixture 22a are maintained in a substantially constant orientation relative to the first frame 50, as shown in phantom in FIG. 3, as the second frame 60 is rotated about the first axis $A_1$. Thus, gravity rotates the first workpiece holder 80 and the workpiece fixture 22a secured thereto relative to the second frame 60 as the second frame 60 is rotated about the first axis $A_1$ such that the fixture 22a and its workpieces 20 are not inverted, i.e., are not rotated 180°, as they move from the load/unload zone 30 to the work zone 32 and vice versa.

Figure 8:
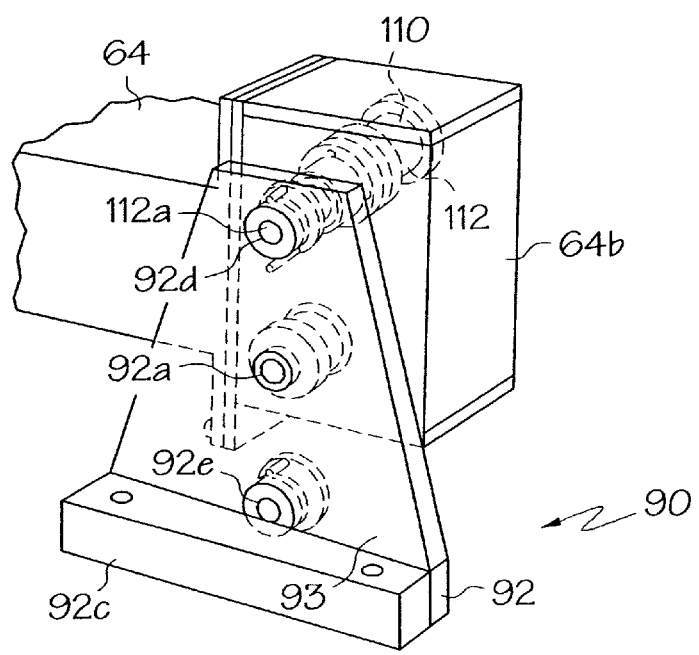
FIG. 8 is a perspective view of the headstock of the second workpiece holder.

The second workpiece holder 90 comprises a second headstock 92 having a shaft 92a, see FIGS. 3 and 8, rotatably mounted in two bearings 92b and a faceplate 93. The bearings 92b are supported in a second end 64b of the second section 64. First and second snap rings 93a and 93b are respectively secured to the shaft 92a and one of the bearings 92b to maintain the shaft 92a and the bearing 92b lockingly secured in place within the second end 64b. A workpiece fixture mounting block 92c is bolted or otherwise secured to the headstock 92, see FIG. 8.

The second workpiece holder 90 further comprises a second tailstock 94 which is rotatably mounted via bearings to a second end 66b of the third section 66, see FIGS. 1 and 2. The tailstock 94 also includes a workpiece fixture mounting block (not shown). The fixture 22b is bolted or otherwise secured to the mounting block 92c and the tailstock mounting block.

Preferably, the workpiece fixture 22b is mounted to the mounting blocks of the headstock 92 and the tailstock 94 so that the center of gravity of the workpiece fixture 22b and its attached workpieces 20 is located below a third axis $A_3$ passing through the bearings supporting the headstock 92 and the tailstock 94, see FIG. 1. Because the headstock and tailstock 92 and 94 are free to rotate relative to the second and third sections 64 and 66, the second workpiece holder 90, the workpiece fixture 22b and its workpieces 20 are maintained in a substantially constant orientation relative to the first frame 50, as shown in phantom in FIG. 3, as the second frame 60 is rotated about the first axis $A_1$. In other words, gravity rotates the workpiece holder 90 and the workpiece fixture 22b about the third axis $A_3$ as the second frame 60 is rotated about the first axis $A_1$ such that the workpieces 20 secured to the fixture 22b are not inverted, i.e., are not rotated 180°, as they move from the work zone 32 to the load/unload zone 30 and vice versa.

It is further contemplated by the present invention that the workpieces 20 may be mounted directly to the workpiece holders 80 and 90 rather than to mounting blocks.

During workpiece removal and loading, it is preferred that the headstocks 82 and 92 be locked to the second section 64. It is also preferred that they be locked to the second section 64 when positioned in the work zone 32 so that workpiece movement does not occur during a welding or a cutting operation.

First and second locking devices 100 and 110 are provided to effect the locking of the headstocks 82 and 92 to the second section 64 before and after rotation cycles. The first locking device 100 comprises a piston/cylinder unit 102 having a piston 102a movable between extended and retracted positions, see FIG. 5. The piston 102a engages a first opening 82d in the first headstock 82 when the headstock 82 is located in the load/unload zone 30 and the piston 102a is extended. The piston 102a engages a second opening 82e in the first headstock 82 when the headstock 82 is located in the work zone 32 and the piston 102a is extended. By engaging one of the two openings 82d and 82e in the headstock 82, the piston 102a brings the headstock 82 to its final position and locks the headstock 82 in a substantially fixed position relative to the second section 64. When the piston 102a is retracted such that it does not engage opening 82d or opening 82e, the headstock 82 is free to rotate relative to the second section 64.

The second locking device 110 comprises a piston/cylinder unit 112 having a piston 112a which is movable between extended and retracted positions, see FIG. 8. The piston 112a engages a first opening 92d in the second headstock 92 when the headstock 92 is located in the work zone 32 and the piston 112a is extended. The piston 112a engages a second opening 92e in the second headstock 92 when the headstock 92 is located in the load/unload zone 30 and the piston 112a is extended. By engaging one of the openings 92d and 92e in the headstock 92, the piston 112 positions and locks the headstock 92 in a substantially fixed position relative to the second section 64. When the piston 112a is retracted such that it does not engage opening 92d or opening 92e, the headstock 92 is free to rotate relative to the second section 64.

While not shown in the illustrated embodiment, it is contemplated that the tailstocks 84 and 94 may be provided with locking devices which are similar to the devices 100 and 110 associated with the headstocks 82 and 92. Further, both headstocks 82 and 92 and both tailstocks 84 and 94 may be provided with locking devices or just the headstocks 82 and 92 or just the tailstocks 84 and 94.

Figure 5:
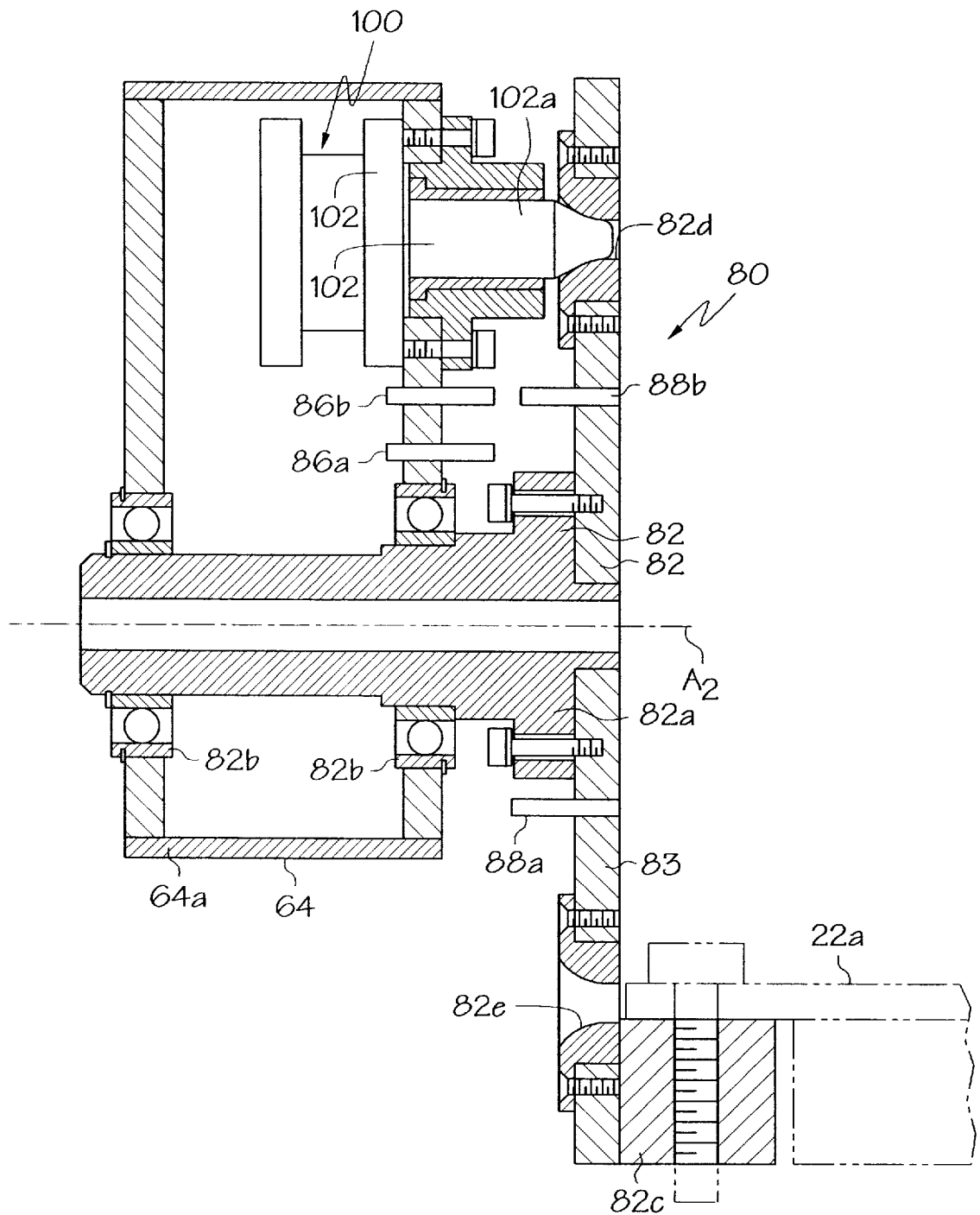
FIG. 5 is a view taken along view line 5—5 in FIG. 4.

First and second proximity sensors 86a and 86b, shown only in FIG. 5, are mounted in the first end 64a of the second section 64. In the illustrated embodiment, the two sensors 86a and 86b are mounted between the shaft 82a and the piston/cylinder unit 102 and are radially offset from one another. First and second flags 88a and 88b, shown only in FIG. 5, are mounted in the face plate 83 on opposite sides of the shaft 82a. The distance from the axis $A_2$ to the first flag 88a is less than the distance from the axis $A_2$ to the second flag 88b. The first flag 88a is positioned on the face plate 83 so that when the second frame 60 is rotated such that the first headstock 82 moves from the load/unload zone 30 to the work zone 32, the flag 88a is positioned directly across from and sensed by the sensor 86a. Upon sensing the first flag 88a, a "first-flag-sensed" signal is generated by the sensor 86a to the controller 320 indicating that the first headstock 82 is properly positioned relative to the second section 64, i.e., the piston 102a is capable of engaging the opening 82e. If the first flag 88a is not positioned within range of the sensor 86a, a "first-flag-sensed" signal is not generated by the sensor 86a to the controller 320. If a "first-flag-sensed" signal is not generated by the sensor 86a after rotation of the first headstock 82 to the work zone 32, the controller 320 shuts down operation of the workpiece positioner 10 and the device 40.

The second flag 88b is positioned on the face plate 83 so that when the second frame 60 is rotated such that the first headstock 82 moves from the work zone 32 to the load/unload zone 30, the flag 88b is positioned directly across from and sensed by the second sensor 86b. Upon sensing the second flag 88b, a "second-flag-sensed" signal is generated by the sensor 86b to the controller 320 indicating that the first headstock 82 is properly positioned relative to the second section 64, i.e., the piston is capable of engaging the opening 82d. If the second flag 88b is not positioned within range of the sensor 86b, a "second-flag-sensed" signal is not generated by the sensor 86b to the controller 320. If no signal is received from the sensor 86b after rotation of the first headstock 82 to the load/unload zone 30, the controller 320 shuts down operation of the workpiece positioner 10 and the device 40.

The second workpiece holder 90 may include two proximity sensors (not shown) mounted in the second end 64b of the second section 64. First and second flags (not shown) may be mounted in the face plate 93 on opposite sides of the shaft 92a. The proximity sensors and flags associated with the second workpiece holder 90 operate in the same manner as the proximity sensors and flags associated with the first workpiece holder 80 to ensure that the second headstock 92 is properly positioned relative to the second end 64b after a rotation cycle has occurred.

Other sensors such as photosensors may be used in place of the proximity sensors associated with the first and second workpiece holders 80 and 90 to detect if the first and second headstocks are properly positioned relative to the second frame 60 after a rotation cycle has occurred.

A workpiece positioner 200, formed in accordance with a second embodiment of the present invention, is illustrated in FIGS. 9–14, wherein like elements are referenced by like numerals. In this embodiment, the first workpiece holder 280 comprises a generally circular first headstock 282 and a first double-cylinder drive device 285 (also referred to herein as a second drive device) which is coupled to the headstock 282. The headstock 282 includes a bore (not shown) which receives a shaft 283 extending from the drive device 285, see FIGS. 12 and 14. The shaft 283 is coupled to the headstock 282 such that the headstock 282 rotates with the shaft 283. The drive device 285 is mounted to a first end 64a of the second section 64. The device 285 is commercially available from Parker Hannifin Corporation under the product designation "PTR-322".

Figure 11:
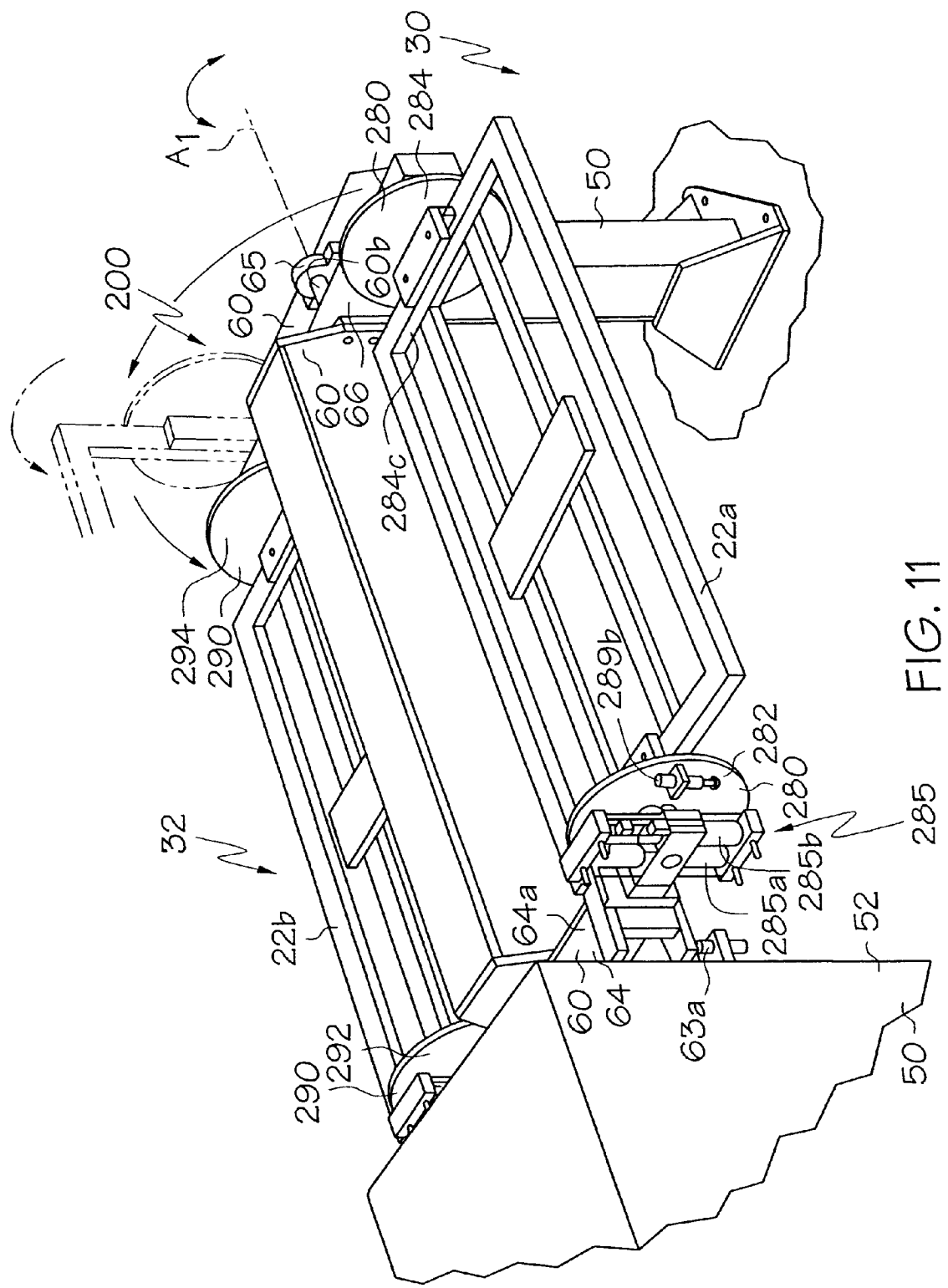
FIG. 11 is a perspective view of the workpiece positioner illustrated in FIG. 9 with its shielding panels removed.

The drive device 285 further includes an internal, rotatable pinion (not shown) and first and second piston/cylinder units 285a and 285b, see FIG. 11. The pinion is fixedly mounted to the hollow shaft 283. Each piston/cylinder unit 285a and 285b comprises a cylinder and an internal piston which reciprocates within the cylinder in response to pressurized fluid, air in the illustrated embodiment, passing into and out of the cylinder. A rack (not shown) is provided on each piston. The racks engage opposite sides of the pinion. They also reciprocate in opposing directions within the device 285 to effect rotation of the pinion. Rotation of the pinion, in turn, effects rotation of the shaft 283 and, hence, rotation of the headstock 282.

A conventional valve bank (not shown) is provided in the cabinet 52 to provide pressurized fluid to the cylinders 285a and 285b. The valve bank is controlled by a controller which, in the illustrated embodiment, also controls the operation of the device 40. First and second sensors 287a and 287b, hall effect devices in the illustrated embodiment, are mounted to the device 285 and sense the end-of-stroke positions of the piston moving within the cylinder 285b, see FIG. 12. The signals generated by the sensors 287a and 287b are provided to the device controller. Once the device controller 320 receives an end-of-stroke signal from one of the sensors 287a or 287b, the controller initiates operation of the device 40. If the headstock 282 moves from its rotated position during a welding or cutting operation, such movement will be detected by one of the sensors 287a and 287b. The one sensor will generate a signal to the device controller in response to the improper headstock movement. The controller will then shut down operation of the device 40.

Figure 12:
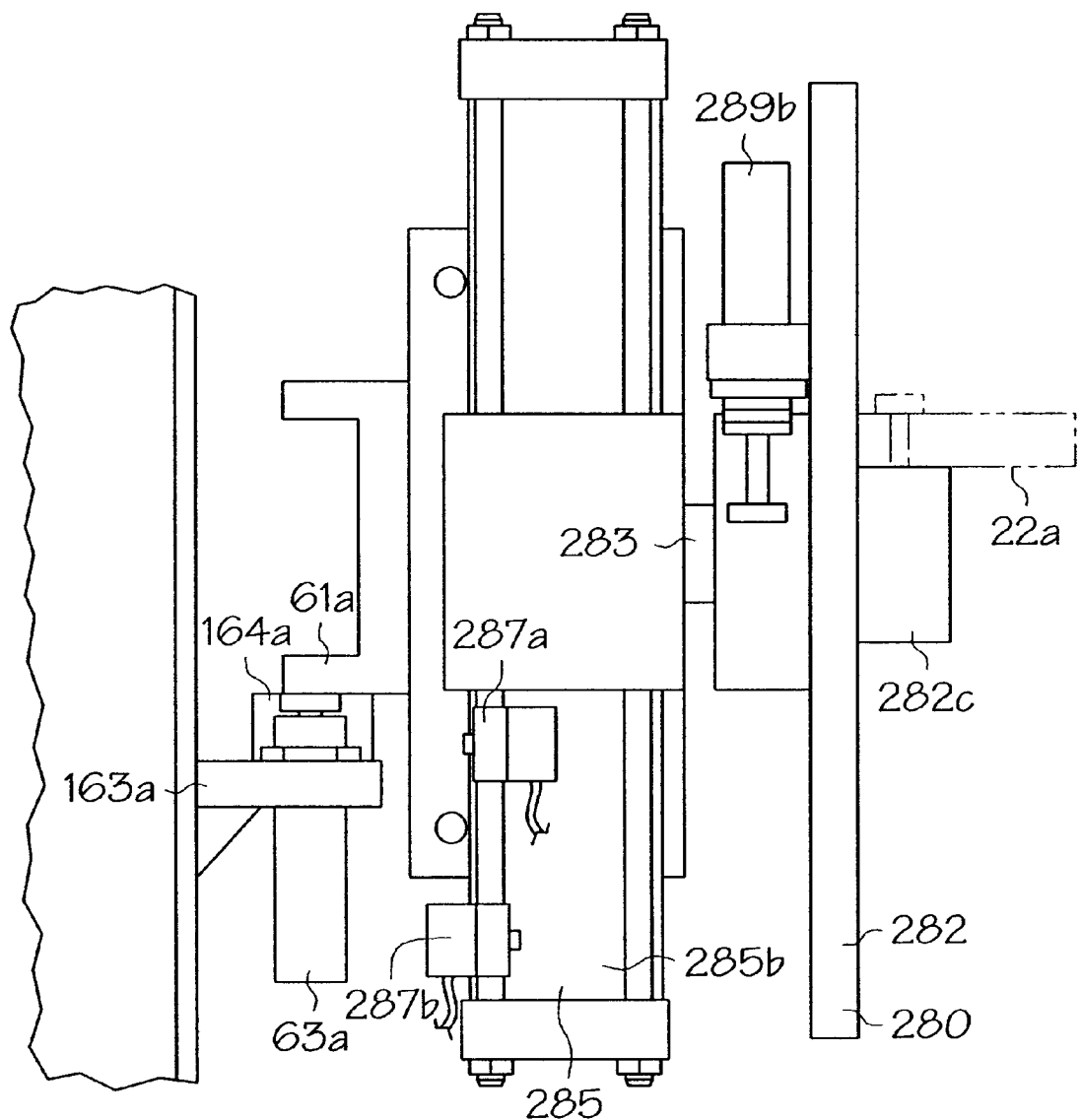
FIG. 12 is a front view of a first headstock and a first double-cylinder drive device of a first workpiece holder of the positioner illustrated in FIG. 9.

A workpiece fixture mounting block 282c is bolted or otherwise secured to the headstock 282, see FIG. 12. A fixture 22a supporting one or more workpieces 20 is bolted or otherwise connected to the block 282c.

The first workpiece holder 280 further comprises a generally circular first tailstock 284 which is rotatably mounted via bearings to a first end 66a of the third section 66, see FIGS. 9–11 and 13. A workpiece fixture mounting block 284c is bolted or otherwise connected to the tailstock 284. An opposite end of the workpiece fixture 22a is bolted to the block 284c.

Figure 13:
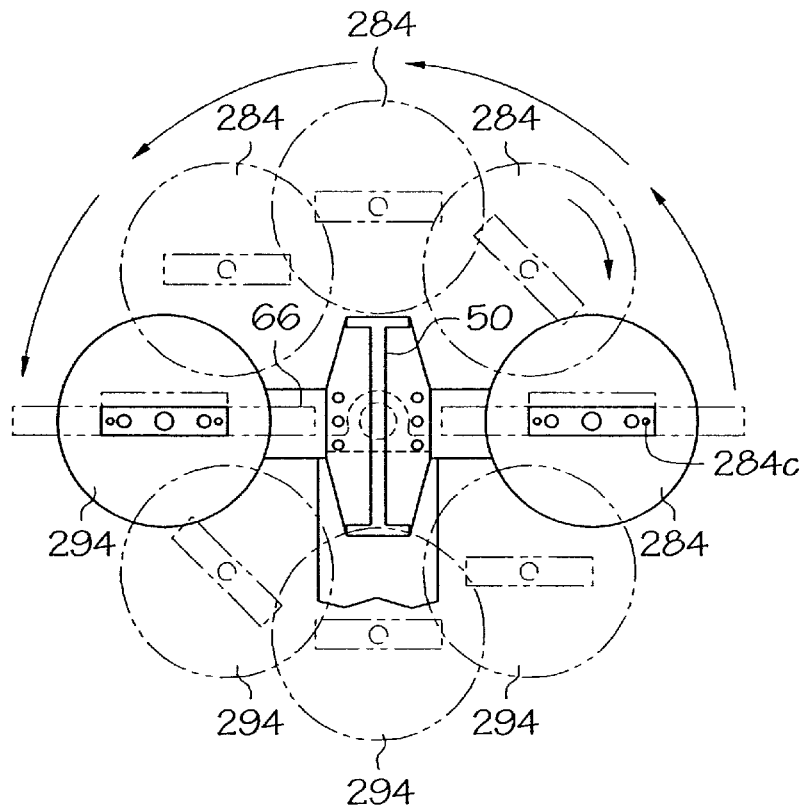
FIG. 13 illustrates in phantom rotation of the first and second tailstocks during rotation of the second main frame.

The drive device 285 effects rotation of the headstock 282 about an axis $A_2$, see FIG. 9. In the illustrated embodiment, the headstock 282 and, hence, the fixture 22a and the tailstock 284, are rotated through an angle of about 180° by the device 285. Preferably, the drive device 285 rotates the fixture 22a simultaneously with the rotation of the second frame 60 about the first axis $A_1$. In FIG. 13, the tailstock 284 is shown in phantom completing its rotation through an angle of 180° before the second frame 60 completes its rotation cycle.

Figure 14:
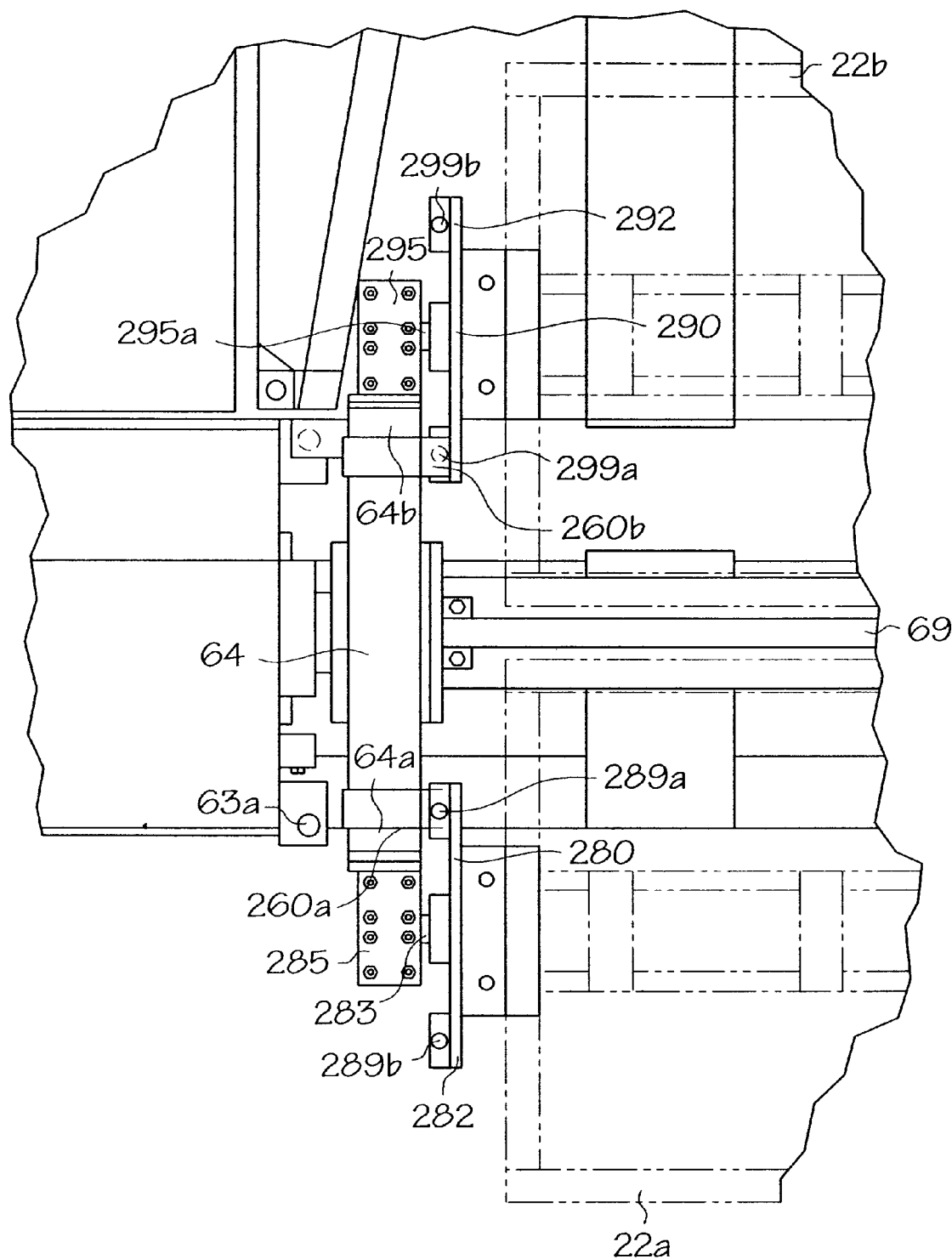
FIG. 14 is a top view of the first and second headstocks of the apparatus illustrated in FIG. 9.

First and second shock absorbers 289a and 289b are fixedly mounted to the headstock 282 for rotation with the headstock 282, see FIGS. 11, 12 and 14. The shock absorbers 289a and 289b may comprise shock absorbers which are commercially available from Ace Controls Inc. under the product designation "ACE SC 650 HD-3." A first stop plate 260a is fixedly connected to the second section 64 of the second frame 60. As the headstock 282 completes a rotation cycle in response to actuation of the drive device 285, one of the shock absorbers 289a or 289b is engaged by the stop plate 260a. The stop plate 260a causes a piston of the engaged shock absorber 289a or 289b to contact a bottom portion of a cylinder of the engaged shock absorber 289a or 289b. Preferably, the piston of the engaged shock absorber contacts the cylinder bottom before full travel of the pistons within the units 285a and 285b has occurred. Thereafter, pressurized fluid continues to be provided to the units 285a and 285b by the valve bank so as to prevent backlash within the drive device 285 and to maintain the headstock 282 in its rotated position. In FIG. 14, the first shock absorber 289a is shown engaging an upper surface of the stop plate 260a. Once the headstock 282 is rotated 180° from the position shown in FIG. 14, the second shock absorber 289b will engage a lower surface of the stop plate 260a.

It is contemplated that the drive device 285 may rotate the headstock 282 at any point before or after the occurrence of a second frame rotation cycle or during any point within a second frame rotation cycle. Thus, the drive device 285 may rotate the headstock 282 once it has been moved into the work zone 32. It is also contemplated that the drive device 285 may rotate the headstock 282 during a welding or cutting cycle.

The second workpiece holder 290 comprises a generally circular second headstock 292 and a second double-cylinder drive device 295 which is coupled to the headstock 292. The headstock 292 includes a bore (not shown) which receives a shaft 295*a* extending from the drive device 295, see FIG. 14. The shaft 295*a* is coupled to the headstock 292 such that the headstock 292 rotates with the shaft 295*a*. The drive device 295 is mounted to a second end 64*b* of the second section 64.

The second drive device 295 is constructed in essentially the same manner as the first drive device 285. The valve bank, discussed previously, provides pressurized fluid to the cylinders (not shown) forming part of the drive device 295 so as to effect rotation of the headstock 292.

The second workpiece holder 290 further comprises a generally circular second tailstock 294 which is rotatably mounted via bearings to a second end 66*a* of the third section 66, see FIG. 9.

The second fixture 22*b* is mounted to mounting blocks which, in turn, are bolted or otherwise connected to the headstock 292 and the tailstock 294.

The drive device 295 effects rotation of the headstock 292 about an axis $A_3$, see FIG. 9. In the illustrated embodiment, the headstock 292 and, hence, the fixture 22*b* and the tailstock 294, are rotated through an angle of about 180° by the device 295. Preferably, the drive device 295 rotates the fixture 22*b* simultaneously with the rotation of the second frame 60 about the first axis $A_1$. However, it is contemplated that the drive device 295 may rotate the headstock 292 at any point before or after the occurrence of a second frame rotation cycle or during any point within a second frame rotation cycle. Thus, the drive device 295 may rotate the headstock 292 once it has been moved into the work zone 32. It is also contemplated that the drive device 295 may rotate the headstock 292 during a welding or cutting cycle.

Third and fourth shock absorbers 299*a* and 299*b* are fixedly mounted to the headstock 292 for rotation with the headstock 292, see FIG. 14. A second stop plate 260*b* is fixedly connected to second section 64 of the second frame 60. As the headstock 292 completes a rotation cycle in response to actuation of the drive device 295, one of the shock absorbers 299*a* or 299*b* engages the stop plate 260*b*. In FIG. 14, the first shock absorber 299*a* is shown engaging a lower surface of the stop plate 260*b*. Once the headstock 292 is rotated 180° from the position shown in FIG. 14, the second shock absorber 299*b* will engage the upper surface of the stop plate 260*b*.

It is contemplated that each of the drive devices 285 and 295 may comprise a single piston cylinder drive device, such as one which is commercially available from Parker Hannifin Corporation under the product designation "PTR-321". It is also contemplated that drive devices 285 and 295 may comprise conventional DC motors. Stepper motors or servo motors are not preferred for use in place of the devices 285 and 295 because of the high cost of such devices.

What is claimed is:

1. A workpiece positioner adapted to move a workpiece from a load/unload zone to a work zone spaced from said load/unload zone, said workpiece positioner comprising:

a first stationary frame having two spaced apart bearings;

a second frame having first and second ends each coupled to one of said spaced apart bearings so as to be rotatable relative to said first stationary frame about a first axis;

a first drive device for effecting rotation of said second frame about said first axis;

a first workpiece holder adapted to releasably receive the workpiece and coupled to said second frame so as to be rotatable by way of gravity about a second axis spaced from said first axis to permit said workpiece holder and the workpiece, when releasable received, to be maintained in a substantially constant orientation relative to said first stationary frame as said second frame is rotated about said first axis; and, a second workpiece holder adapted to releasably receive another workpiece and coupled to said second frame so as to be rotatably by way of gravity independent from said first workpiece holder about a third axis which is spaced from said first and second axes.

2. A workpiece positioner as set forth in claim 1, further comprising first and second locking devices fixedly mounted to said second frame and adapted to engage said first and second workpiece holders respectively, to maintain said first and second workpiece holders in a substantially fixed position relative to said second frame when said workpiece holders are located in one of said load/unload zone and said work zone.

3. A workpiece positioner as set forth in claim 2, wherein each of said locking devices comprises a piston/cylinder unit having a piston which is movable between extended and retracted positions, said piston engaging its respective workpiece holder when positioned in its extended position so as to lock said respective workpiece holder in a substantially fixed position relative to said second frame and said piston not engaging said respective workpiece holder when positioned in its retracted position such that said respective workpiece holder is capable of rotating relative to said second frame.

4. A workpiece positioner as set forth in claim 1, wherein said workpiece positioner further comprises first and second shielding panels which are fixedly connected to said second frame.

5. A workpiece positioner as set forth in claim 1, wherein said second frame further includes between said first and second ends a first section rotatable about said first axis, and second and third sections fixedly mounted to said first section, said third section being spaced from said second section and said second and third sections being substantially transverse to said first section.

6. A workpiece position as set forth in claim 5, wherein each of said first and second workpiece holders comprises a headstock rotatably mounted to said second section and a tailstock rotatably mounted to said third section.

7. A workpiece positioner as set forth in claim 6, further comprising sensors for detecting if said headstock of each said first and second workpiece holder is properly positioned relative to said second section after said second frame has been rotated about said first axis.

8. A workpiece positioner adapted to move a workpiece from a load/unload zone to a work zone spaced from said load/unload zone, said workpiece positioner comprising:

a first stationary frame;

a second frame having at least one piston, said second frame is coupled to said first frame so as to be rotatably relative to said first frame about a first axis;

a first drive device for effecting rotation of said second frame about said first axis; and at least one workpiece holder having first and second openings and adapted to releasably receive the workpiece and rotatably mounted to said second frame so that said workpiece holder and said workpiece are maintained in a substantially constant orientation relative to said first frame by being rotated by way of gravity as said second frame is rotated about said first axis, and said piston engageable in said first opening when said workpiece holder is located in the load/unload zone, and engageable in said second opening when said workpiece holder is in the work zone.

* * * * *